United States Patent
Ramasubramonian et al.

(10) Patent No.: US 12,026,922 B2
(45) Date of Patent: Jul. 2, 2024

(54) ATTRIBUTE PARAMETER CODING FOR GEOMETRY-BASED POINT CLOUD COMPRESSION

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Geert Van der Auwera, Del Mar, CA (US); Louis Joseph Kerofsky, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 17/355,414

(22) Filed: Jun. 23, 2021

(65) Prior Publication Data

US 2021/0407144 A1   Dec. 30, 2021

Related U.S. Application Data

(60) Provisional application No. 63/044,931, filed on Jun. 26, 2020.

(51) Int. Cl.
*G06T 9/00* (2006.01)
*G06T 17/20* (2006.01)

(52) U.S. Cl.
CPC .............. *G06T 9/001* (2013.01); *G06T 17/20* (2013.01)

(58) Field of Classification Search
CPC ........... G06T 9/001; G06T 17/20; G06T 9/00; G06T 9/004; G06T 9/40; G06T 15/00; G06T 15/10; G06T 19/00; G06T 19/20; G06T 17/00; G06T 2207/10028; G06T 2200/04; G06T 2210/56; G06T 2201/12; H04N 19/597; H04N 19/70; H04N 13/161; H04N 19/90–99; H04N 21/816;

(Continued)

(56) References Cited

U.S. PATENT DOCUMENTS

2020/0302650 A1*  9/2020  Aksu ................... G06T 9/00
2020/0351484 A1* 11/2020  Aflaki .................. G06T 7/41

(Continued)

FOREIGN PATENT DOCUMENTS

WO      2019093834 A1     5/2019

OTHER PUBLICATIONS

ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.

(Continued)

*Primary Examiner* — Jose L Couso
(74) *Attorney, Agent, or Firm* — Shumaker & Sieffert, PA

(57) ABSTRACT

An example method of encoding a point cloud includes determining one or more attribute parameters of an attribute of a point in the point cloud of a frame, wherein the one or more attribute parameters define how to determine or use a value of the attribute and are applicable to a plurality of points in the point cloud; and signaling, in a bitstream indicative of the point cloud, the one or more attribute parameters in a syntax structure that is specific to the frame.

38 Claims, 5 Drawing Sheets

(58) Field of Classification Search
CPC ....... G06V 20/64; G01S 17/89; G01S 17/894; G01S 13/89
See application file for complete search history.

(56) References Cited

U.S. PATENT DOCUMENTS

| | | | |
|---|---|---|---|
| 2021/0104013 A1* | 4/2021 | Hur | G06T 3/40 |
| 2021/0104090 A1* | 4/2021 | Hur | H04N 13/15 |
| 2021/0209813 A1* | 7/2021 | Hur | G06T 9/40 |
| 2021/0319581 A1* | 10/2021 | Hur | G06T 7/60 |

OTHER PUBLICATIONS

International Search Report and Written Opinion—PCT/US2021/038825—ISA/EPO—Oct. 13, 2021 (11 pp).

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

Flynn (Apple) D., et al., "G-PCC: Signalling of Default Attribute Values", 130. MPEG Meeting, Apr. 20, 2020-Apr. 24, 2020, Alpbach, (Motion Picture Expert Group or ISO/IEC JTC1/SC29/WG11), No. m53681, Apr. 15, 2020 (Apr. 15, 2020), XP030287361, 2 pages, Retrieved from the Internet: URL: http://phenix.int-evry.fr/mpeg/doc_end_user/documents/130_Alpbach/wg11/m5368-v1-m53681_v1.zip m53681.pdf [retrieved on Apr. 15, 2020].

"Text of ISO/IEC 23090-9 DIS Geometry-Based Point Cloud Compression", 129. MPEG Meeting, Jan. 13, 2020-Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129_Brussels/wg11/w19088.zip w19088_d10_clean.pdf [retrieved on-Apr. 20, 2020].

* cited by examiner

ATTRIBUTE PARAMETER CODING FOR GEOMETRY-BASED POINT CLOUD COMPRESSION

This application claims the benefit of U.S. Provisional Application No. 63/044,931, filed Jun. 26, 2020, the entire contents of which are incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for attribute coding for geometry-based point cloud compression. For instance, the disclosure describes example techniques of signaling, in a bitstream indicative of a point cloud, and parsing, from a bitstream indicative of a point cloud, attribute parameters of an attribute of the point cloud of a frame. An attribute parameter may define how to determine or use a value of the attribute, and may not necessarily be the value of the attribute. For instance, an attribute may include one or more components (e.g., a color attribute includes red, green, and blue components or luminance and chrominance components). The value of the attribute may be the value of any of the components of the attribute. The attribute parameter may not be the value of the component, but a parameter used to determine the value of the component (e.g., scale and offset) or how to use the value of the component (e.g., interpret the attribute).

This disclosure describes example techniques of signaling and parsing one or more attribute parameters in a syntax structure that is specific to a frame. For instance, the attribute parameters may be different for different frames, and signaling and parsing attribute parameters in a parameter set that applies to a plurality of frames may result in poorer reconstruction of the value of the attribute. As an example, an attribute parameter may be applicable to one frame, but not another. However, by signaling and parsing the attribute parameter in the parameter set that applies to multiple frames, there may not be flexibility in setting attribute parameters specific to each frame.

In one or more examples, the syntax structure that includes the one or more attribute parameters may be specific to each frame allowing for flexibility of setting attribute parameters specific for each frame. Also, the syntax structure need not necessarily be signaled and parsed as part of signaling and parsing the frame, allowing for additional freedom of where the syntax structure can be signaled in the bitstream. For instance, the syntax structure may include a syntax element that identifies the particular frame and indicates that the syntax structure is specific to that particular frame.

Moreover, some techniques limit attribute parameters such as scale and offset to be power of two values, where a power of two value refers to a value where two to the power an integer number can equal the value (e.g., 2, 4, 8, 16, 32, etc.). This disclosure describes examples where the attribute parameters such as scale and offset are not limited to be power of two values (e.g., scale value and offset value is not a power of two value or is a fractional value).

In one example, this disclosure describes a method of encoding a point cloud includes determining one or more attribute parameters of an attribute of a point in the point cloud of a frame, wherein the one or more attribute parameters define how to determine or use a value of the attribute and are applicable to a plurality of points in the point cloud; and signaling, in a bitstream indicative of the point cloud, the one or more attribute parameters in a syntax structure that is specific to the frame.

In another example, this disclosure describes a method of decoding a point cloud includes parsing, from a bitstream indicative of the point cloud, one or more attribute parameters of a point in the point cloud of a frame in a syntax structure that is specific to the frame, wherein the one or more attribute parameters define how to determine or use a value of the attribute and are applicable to a plurality of points in the point cloud; and reconstructing the point of the point cloud based on the one or more attribute parameters.

In another example, this disclosure describes a device for encoding a point cloud includes memory configured to store the point cloud; and processing circuitry configured to: determine one or more attribute parameters of an attribute of a point in the point cloud of a frame, wherein the one or more attribute parameters define how to determine or use a value of the attribute and are applicable to a plurality of points in the point cloud; and signal, in a bitstream indicative of the point cloud, the one or more attribute parameters in a syntax structure that is specific to the frame.

In another example, this disclosure describes a device for decoding a point cloud includes memory configured to store the point cloud; and processing circuitry configured to: parse, from a bitstream indicative of the point cloud, one or more attribute parameters of a point in the point cloud of a frame in a syntax structure that is specific to the frame, wherein the one or more attribute parameters define how to determine or use a value of the attribute and are applicable to a plurality of points in the point cloud; and reconstruct the point of the point cloud based on the one or more attribute parameters.

In another example, this disclosure describes a computer-readable storage medium storing instructions thereon that when executed cause one or more processors to: determine one or more attribute parameters of an attribute of a point in the point cloud of a frame, wherein the one or more attribute parameters define how to determine or use a value of the attribute and are applicable to a plurality of points in the point cloud; and signal, in a bitstream indicative of the point cloud, the one or more attribute parameters in a syntax structure that is specific to the frame.

In another example, this disclosure describes a computer-readable storage medium storing instructions thereon that when executed cause one or more processors to: parse, from a bitstream indicative of the point cloud, one or more attribute parameters of a point in the point cloud of a frame in a syntax structure that is specific to the frame, wherein the one or more attribute parameters define how to determine or use a value of the attribute and are applicable to a plurality of points in the point cloud; and reconstruct the point of the point cloud based on the one or more attribute parameters.

In another example, this disclosure describes a device for encoding a point cloud includes means for determining one or more attribute parameters of an attribute of a point in the point cloud of a frame, wherein the one or more attribute parameters define how to determine or use a value of the attribute and are applicable to a plurality of points in the point cloud; and means for signaling, in a bitstream indicative of the point cloud, the one or more attribute parameters in a syntax structure that is specific to the frame.

In another example, this disclosure describes a device for decoding a point cloud includes means for parsing, from a bitstream indicative of the point cloud, one or more attribute parameters of a point in the point cloud of a frame in a syntax structure that is specific to the frame, wherein the one or more attribute parameters define how to determine or use a value of the attribute and are applicable to a plurality of points in the point cloud; and means for reconstructing the point of the point cloud based on the one or more attribute parameters.

The details of one or more examples are set forth in the accompanying drawings and the description below. Other features, objects, and advantages will be apparent from the description, drawings, and claims.

DETAILED DESCRIPTION

Figure 1:
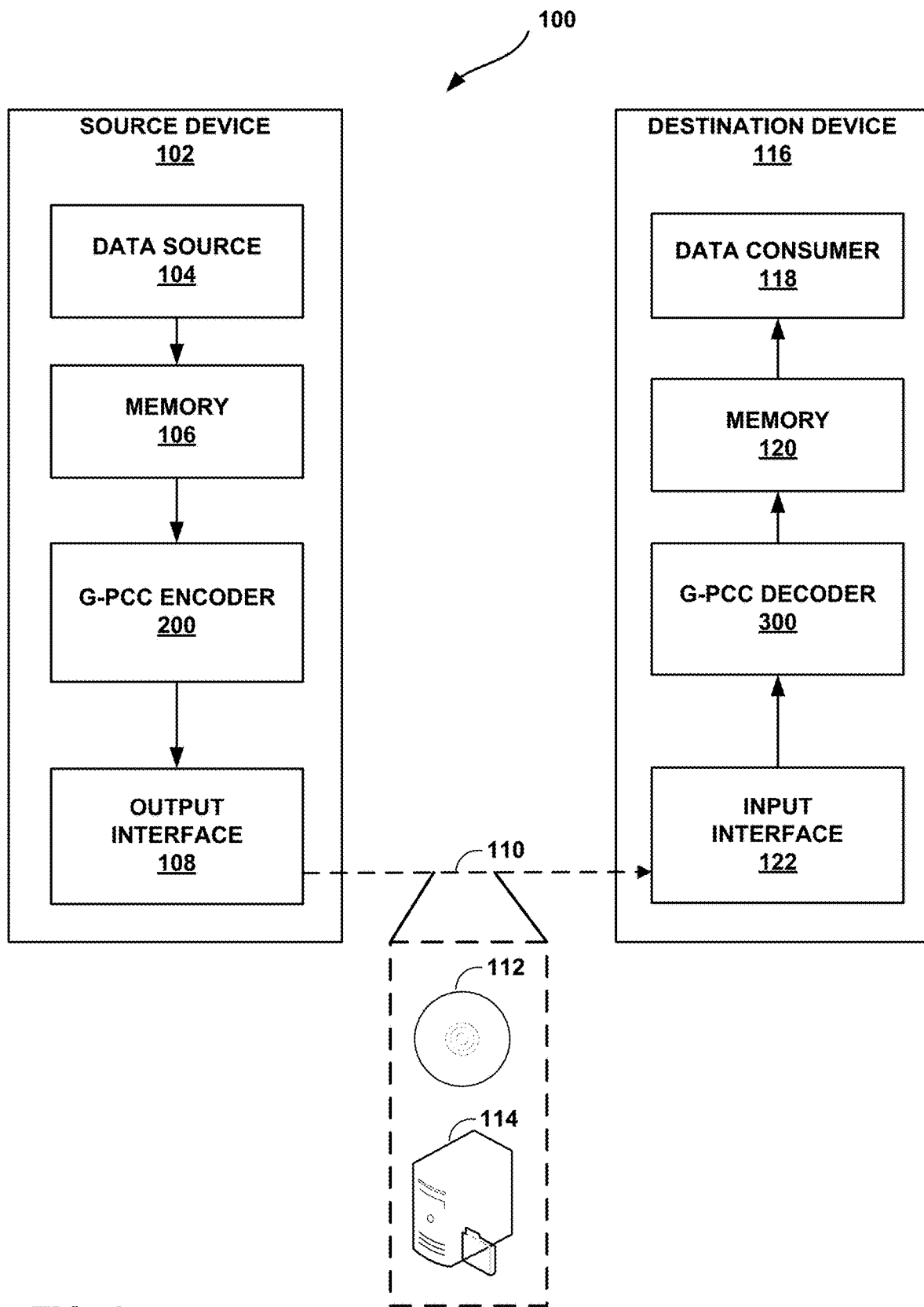
FIG. 1 is a block diagram illustrating an example encoding and decoding system that may perform the techniques of this disclosure.

In examples of Geometry Point Cloud Compression (G-PCC), a frame includes a plurality of points that form a point cloud. Each point includes one or more attributes, such as color attribute, coordinate attribute, reflectance attribute, etc. Each attribute may include one or more values. For instance, some attributes may include multiple components, also called multiple dimensions. As an example, the color attribute may include three components (e.g., RGB or luma component and two chroma components). The coordinate attribute may include three components (e.g., x, y, z-components). Some attributes include only one component (e.g., reflectance). A value of the attribute may refer to the value of any one of the one or more components of the attribute.

In addition to the value of the attribute, one or more attributes may be associated with one or more attribute parameters. An attribute parameter may define how to determine or use a value of the attribute. For instance, scale and offset parameters are example of attribute parameters that define by how much to scale and offset a value of the attribute to determine the actual value of the attribute. As another example, a default parameter may be a default value for an attribute in the event that a value for the attribute is not signaled. As another example, a range parameter may define a range within which the value of the attribute resides.

This disclosure describes example techniques for signaling and parsing one or more attribute parameters in a way that allows flexibility in which attribute parameters apply to which points in a frame. For instance, a G-PCC encoder may signal, in a bitstream indicative of the point cloud, one or more attribute parameters in a syntax structure that is specific to the frame. A G-PCC decoder may parse, from a bitstream indicative of the point cloud, the one or more attribute parameters in a syntax structure that is specific to the frame.

For instance, for each of one or more frames, there may be a respective syntax structure associated with that frame (e.g., a first syntax structure is associated with a first frame, a second syntax structure is associated with a second frame, and so on). In this way, each syntax structure is specific to one frame.

By having a syntax structure that is specific to the frame, the G-PCC encoder may determine attribute parameters for an attribute of a point in a point cloud of a frame that are going to be specialized for the attribute in that frame. Some techniques utilized parameters sets like a sequence parameter set (SPS) to signal attribute parameters for an attribute. However, because the SPS is applicable to multiple frames, the attribute parameters may not be specialized to attribute in any one frame, but to all of the frames associated with the SPS. In such techniques that relied on the SPS, the attribute parameter for a frame may not be the attribute parameter that results in the optimal value for the attribute. In the example techniques described in this disclosure, with the use of the syntax structure, the attribute parameters may be set specific to attributes of a particular frame allowing for determining optimal values for the attribute, rather than an approximation that is adequate for determining a value for an attribute for many frames.

Moreover, there may not be a need to signal the syntax structure for the attribute parameters in the frame. Rather, the G-PCC encoder may signal the syntax structure anywhere in the bitstream, providing for additional signaling flexibility. For instance, the syntax structure for the attribute parameters in the frame may include a syntax element that identifies the frame and indicates that the syntax structure is specific to the identified frame. In this manner, the G-PCC decoder may determine to which frame the attribute parameters are specific to, and determine the attribute parameters for that frame even if the syntax structure for the attribute parameters is not signaled along with the frame.

As described above, some techniques limit attribute parameters such as scale and offset to be power of two values, where a power of two value refers to a value where two to the power an integer number can equal the value (e.g., 2, 4, 8, 16, 32, etc.). This disclosure describes examples where the attribute parameters such as scale and offset are not limited to be power of two values (e.g., scale value and offset value is not a power of two value or is a fractional value).

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to attribute parameter coding for geometry-based point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to attribute parameter coding for geometry-based point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a web site), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

As described above, each point in the point cloud may be associated with one or more attributes. Each attribute may be associated with one or more values. For instance, an attribute may include one component (e.g., one dimension) or multiple components (e.g., multiple dimensions). As one example, the reflectance attribute may include one component, but the color attribute may include three components (e.g., RGB or one luma and two chroma components).

For attributes with one component, there may be one value for the attribute. For attributes with multiple components, there may be a value for each component of the attribute. In this disclosure, a value of the attribute refers to the value of the attribute where there is one component or a value of one of the components of the attribute.

In addition to components, each attribute may be associated with one or more attribute parameters. The attribute parameters may define how to determine or use a value of the attribute. For instance, the attribute parameter may be a default value for an attribute, such as in examples where G-PCC encoder 200 does not signal an actual value for an attribute. The attribute parameter may be a scale parameter and/or offset parameter that defines an amount by which to scale or offset a value that G-PCC encoder 200 signals for an attribute. The attribute parameter may also define how the attribute is to be used (e.g., how to interpret the attribute values by a decoder side entity).

The value of an attribute that is coded in G-PCC may be referred to as coded value, and this may be different from an "actual" value of the attribute. The need for a difference in the coded and "actual" value may be due to restrictions of the G-PCC codec, or due to more efficient coding of attribute values. For example, consider an attribute that has "actual" values of an attribute are in the range of [512,767]. To code this attribute value, G-PCC encoder 200 and G-PCC decoder 300 should be able to support 10 bits. However, with an offset of 512, the coded value would fall in the range [0,255], which can be coded by 8-bit coder. That is, G-PCC encoder 200 and G-PCC decoder may need to support 8 bits, and not 10 bits.

Supporting larger bit depths requires more expensive hardware, and in some cases more computations. In this example, the "offset" attribute parameter of 512 would be set (scale=1). Attribute parameters present in a bitstream may not always be used by G-PCC decoder 300, but may be used by an entity at the decoder-side that tries to recover the "actual" value of the attribute. In the example above, the offset of 512 would be added back to the decoded attribute values to obtain the final attribute value. In another example, the actual value of attribute may be a floating point number/ fixed point number with large value range. The G-PCC coder (e.g., G-PCC encoder 200 or G-PCC decoder 300) may be unable to code (e.g., encode or decode) these attribute values as such. Attribute parameter (e.g., scale, offset) may be used to transform the values to a value range that can be supported by the coder.

In general, an attribute parameter may be a parameter that is applicable to an attribute of a plurality of points within a frame. For instance, for each point having a particular attribute, the attribute parameter for that attribute may be applicable to each of those points. Stated yet another way, the attribute parameter may be a global parameter applicable to an attribute for many points.

Because attribute parameters are applicable to an attribute of a plurality of frames, in some techniques, G-PCC encoder 200 signals the attribute parameters in a sequence parameter set (SPS). The SPS may be associated with a plurality of frames. Therefore, the attribute parameter would be applicable to an attribute for all points in each of the frames.

However, having an attribute parameter applicable to an attribute for all point in each of a plurality of frames may result in poorer reconstruction of the value of the attribute. For instance, a particular scale or offset may be optimal for reconstructing a value of the attribute for points in a first frame, but may not be optimal for reconstructing a value of the attribute for points in a second frame.

This disclosure describes example techniques to signal and parse (e.g., in or from a bitstream indicative of a point cloud) a syntax structure that is specific to a particular frame, where that syntax structure defines attribute parameters specifically for that particular frame. For instance, G-PCC encoder 200 may be configured to determine one or more attribute parameters of an attribute of a point in the point cloud of a frame. As described above, the one or more attribute parameters define how to determine or use a value of the attribute (e.g., default value, scale parameter, offset parameter, etc.), and may be applicable to a plurality of points in the point cloud and signal the one or more attribute parameters in a syntax structure that is specific to the frame (e.g., associated with the frame).

For instance, G-PCC encoder 200 may signal, in a bitstream, a syntax element, in the syntax structure, that identifies the frame and indicates that the syntax structure is specific to the identified frame. G-PCC encoder 200 may also signal the syntax element separate from the frame and separate from a parameter set (e.g., not part of the frame or part of an SPS). In this way, there may be flexibility in where in the bitstream G-PCC encoder 200 signals the syntax structure.

From the perspective of G-PCC decoder 300, G-PCC decoder 300 may parse, from a bitstream, one or more attribute parameters of a point in the point cloud of a frame in a syntax structure that is specific to the frame. The one or more attribute parameters define how to determine or use a value of the attribute and are applicable to a plurality of points in the point cloud. G-PCC decoder 300 may reconstruct the point of the point cloud based on the one or more attribute parameters. In some examples, G-PCC decoder 300 may utilize the attribute parameters, but the techniques are not so limited. There may be some attribute parameters that are used by a decoder side entity (e.g., an application that uses the point cloud) that utilizes the attribute parameter. For instance, the decoder side entity may use the attribute parameter after G-PCC decoder 300 reconstructs the point cloud.

For instance, G-PCC decoder 300 may parse a syntax element, in the syntax structure, that identifies the frame and indicates that the syntax structure is specific to the identified frame. This way, regardless of where in the bitstream G-PCC decoder 300 decodes the syntax structure, G-PCC decoder 300 can determine to which frame that syntax structure is specific to, and apply the attribute parameters to that attributes of points in that frame. For instance, G-PCC decoder 300 may parse the syntax structure separate from the frame and separate from a parameter set (e.g., parse the syntax structure as not part of the frame or part of an SPS).

In the above examples, G-PCC encoder 200 signals and G-PCC decoder 300 parses the syntax structure that includes the attribute parameters for a frame. In some examples, in addition to the syntax structure, a parameter set, like the SPS, may also include the attribute parameters for a frame (although may not be specific to just one frame). In such examples, there is a possibility that the attribute parameters in the syntax structure and the SPS are different. In such cases, the application performing the encoding and decoding may be preconfigured with information indicating which attribute parameter to use (e.g., attribute parameter from syntax structure or SPS).

For example, G-PCC decoder 300 may determine that at least one attribute parameter parsed in the SPS is not the same as an attribute parameter of the same parameter type in the syntax structure. In such examples, G-PCC decoder 300 or some other decoder-side entity may select the attribute parameter of the same parameter type in the syntax structure for reconstructing the point based on the determination.

Figure 2:
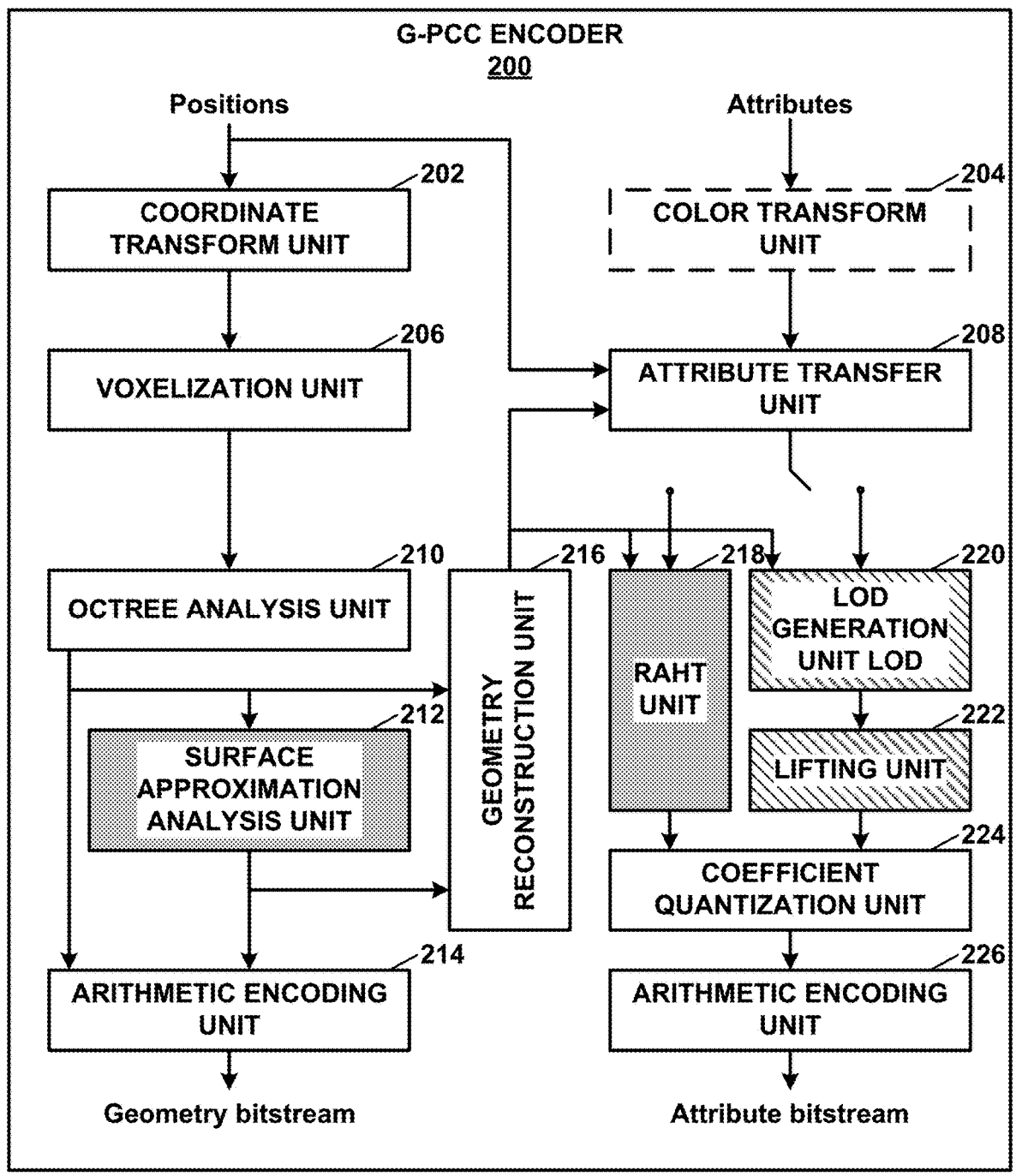
FIG. 2 is a block diagram illustrating an example Geometry Point Cloud Compression (G-PCC) encoder.
Figure 3:
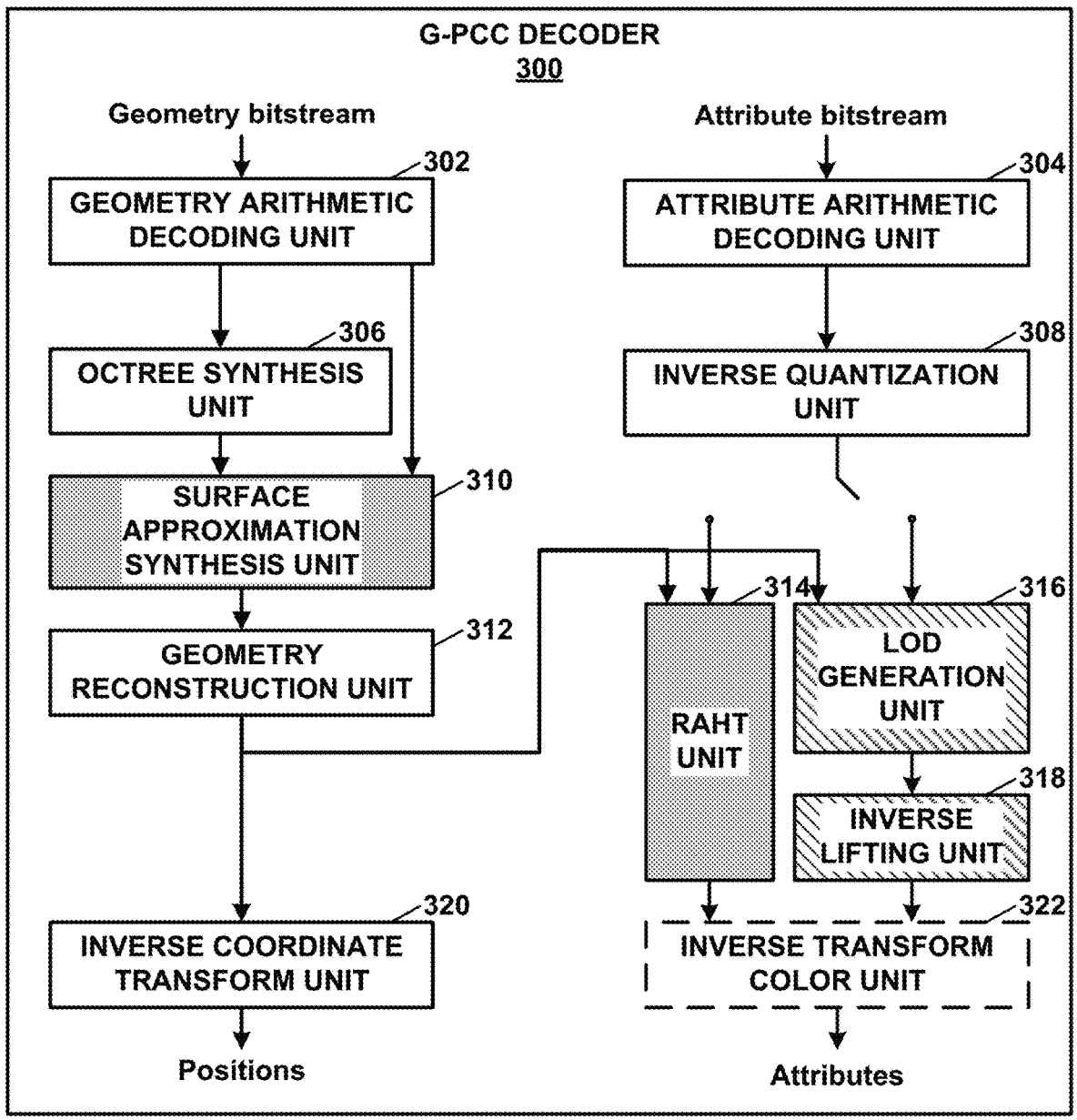
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LoD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

The following describes coding frame index. In several applications, point cloud data, or points in the point cloud data, are associated with some aspect of time. This (e.g., the aspect of time) may correspond to the point of capture of the point or may correspond to a presentation/display time for the point cloud. In some examples, the aspect of time may not be an absolute time and rather relative to some reference time.

This time component may be specified as a specific attribute associated with time or may be coded as a frame index. Frame index may serve the purpose of specifying the relation between the associated time points. For example, when a point A has frame index 3 and another point B has frame index 4, assuming that frame index magnitude is proportional to the time, point B is associated with a later point of time than point A.

In some examples, some point clouds may be store/represented as separate frames. Unless there is explicit signaling of frame index or time associated for each point within a frame, all the points in the frame may be associated with the same time instant.

G-PCC codec supports "fusing" multiple frames such that coding multiple frames may be more efficient. The frame index is added as an attribute in this case to distinguish points from the different frames that were fused. In G-PCC, this is known as "fused-coding" of frames.

The following describes frame counter. In addition to or instead of "frame index" as an attribute, G-PCC also supports a variable called frame_idx, which may be specified as a "notional frame counter" and may be used to associate data units with the associated frame. In the absence of frame boundary markers, data units belonging to different frames are identified based on the difference in values of the frame_idx variable. There may be no restriction that the frame_idx variables of consecutive frames should differ by value of 1.

Currently there is an ambiguity in the definition of a frame. When a group of frames are "fused" together, each individual frame is referred to as a "frame" and the "fused" frame is also referred to as a frame. However, fused frame is not necessarily always used. In some examples, this disclosure describes referring to the frame that is encoded by G-PCC as a frame, so in that sense, the "fused" frame, when fusing is applied, is called a frame. The "individual" frames that are used to generate the fused frame may be referred to as "sub-frames." When fused frame is not used, a sub-frame is the same as a frame.

The following describes general attribute descriptions. Attributes may have several parameters that need to be used for decoding, or in some cases for interpreting the attributes (e.g., how to interpret the values in applications). Some parameters may apply to certain attributes, but not to others. A generalized scheme to describe attributes was adopted in G-PCC: Extensible signalling of attribute descriptions, ISO/IEC JTC1/SC29/WG11 MPEG m53680, Alpbach, April 2020 where each attribute may be assigned one or more parameter types. For each attribute, the respective parameter type may be signaled, along with the parameters. The current TMC13 (v10.0) may define three specific parameter types. Other parameter types may be defined in future, reserved for certain purposes or may be general-purpose with flexible signaling. The three parameters specified include CICP (cluster iterative closest point) parameters, default value of attributes, and a pair of scale-offset parameters.

The following is example of information in a sequence parameter set (SPS) that includes parameter types.

```
sequence_parameter_set( ) {
    ...
    for (attrIdx = 0; attrIdx < num_attributes; attrIdx++) {
        ...
        num_attribute_parameters = u(8)
        for (i = 0; i < num_attribute_parameters; i++)
            attribute_parameter( )
    }
    ...
}
attribute_parameter( ) {
attr_param_type = u(8)
attr_param_len = u(8)
if (attr_param_type == 0) {
    itu_t_t35_country_code = u(8)
    if (itu_t_t35_country_code < 255)
        attribute_parameter_data(attr_param_len - 1);
    else {
        itu_t_t35_country_code_extension_byte = u(8)
        attribute_parameter_data(attr_param_len - 2);
    }
} else if (attr_param_type == 1) {
    attribute_parameter_oid = oid( )
        attribute_parameter_data(attr_param_len - Len(attribute_parameter_oid))
} else if (attr_param_type == 2) {
    cicp_colour_primaries_idx = ue(v)
    cicp_transfer_characteristics_idx = ue(v)
    cicp_matrix_coefficients_idx = ue(v)
    cicp_video_full_range_flag = ue(v)
} else if (attr_param_type < 128)
    /* Reserved for future use */
else
    attribute_parameter_data(attr_param_len)
byte_align( )
}
attribute_parameter_data(len) {
for (i = 0; i < len; i++)
    attr_param_byte[i] = u(8)
}
```

The following describes example techniques in accordance with one or more examples described this is disclosure. The example techniques may be applied independently or combined.

The following describes renaming of frame_idx as frame_counter to distinguish with frame index attribute. For instance, the frame_idx variable may be renamed as frame_ctr to distinguish between this variable and frame index attribute.

The following describes allowing frame_idx to wrap and describes example definition of a frame counter variable. The frame_idx variable is specified as a fixed length variable and denotes the LSBs of the notional frame counter. However, when multiple frames are specified, there should be some association of the frame counter with the order of frames. If frame_idx is coded with N bits, and the number of frames is more than $2^N$, the frame counter may reset. It would be useful to distinguish the various frames within point cloud even when the frame counter resets.

The variable FrameCtr may be derived as follows:

If the current frame is the first frame in the bitstream, FrameCtr is set equal to frame_idx. Otherwise, the variable FrameCtr is updated as follows when a new frame is decoded:

```
maxFrameIdx = 1 << log2_max_frame_idx
frameCtrLsb = FrameCtr % maxFrameIdx
frameCtrMsb = FrameCtr >> log2_max_frame_idx
if( frame_idx > frameCtrLsb )
    FrameCtr = frameCtrMsb << log2_max_frame_idx + frame_idx
else
    FrameCtr = (frameCtrMsb + 1) << log2_max_frame_idx + frame_idx
```

Also, the following constraints may be added so that there is no ambiguity in the association of slices to the various frames:

It is requirement of bitstream conformance that the following conditions are satisfied:

A frame boundary marker shall be present for each frame in the point cloud.

Alternatively, the frame counter may also be calculated from the frame_idx using the following:

If the current frame is the first frame in the bitstream, FrameCtr is set equal to frame_idx. Otherwise, the variable FrameCtr is updated as follows when a new frame is decoded:

```
    maxFrameIdx = 1 << log2_max_frame_idx
frameCtrLsb = FrameCtr % maxFrameIdx
frameCtrMsb = FrameCtr >> log2_max_frame_idx
if( frame_idx < frameCtrLsb ) && ( frameCtrLsb – frame_idx ) >= (maxFrameIdx/2)
    frameCtrMsb = frameCtrMsb + 1
    else if( frame_idx > frameCtrLsb ) && (frame_idx – frameCtrLsb ) > (maxFrameIdx/2)
    frameCtrMsb = frameCtrMsb – 1
    else
    frameCtrMsb = frameCtrMsb
    FrameCtr = frameCtrMsb << log2_max_frame_idx + frame_idx
```

The following describes combining frame_idx and frame index to derive a frame counter. Fused coding is a mode at which G-PCC encoder 200 can choose to operate. The frames may be pre-processed and then fused, with frame index being an added attribute. However, there is no indication in the bitstream, whether the frame index attribute within each frame is calculated with respect to sub-frames within the fused frame, or with respect to the actual frame number of the sub-frame containing those points.

In one or more examples, FrameIndexAttr may be a variable denoting the value of the decoded frame index attribute for a point in the point cloud. Following are some example methods that may be used to derive a frame number associated with the point.

For each point, a FrameIndexReference is defined, which is used to calculate the frame number. The frame number may be derived as follows:

FrameNumber=FrameIndexReference+FrameIndexAttr

FrameIndexReference may be chosen as one of the following:
frame_idx associated with the frame
frame_idx*framePeriod, where framePeriod indicates how many frames may be associated with an actual point cloud frame; framePeriod may be signalled in the bitstream.
The maximum FrameNumber derived for the previous coded point cloud frame plus an offset. This offset may be signalled in the bitstream associated with one or more frames. For example, this offset may be signalled with the preceding frame to indicate the number of frames that were used to generate the combined frame.
The FrameIndexReference for the previous coded point cloud frame plus an offset. This offset may be signalled in the bitstream associated with one or more frames (e.g., num_frames_fused)
For the first frame of the bitstream FrameIndexReference may be set to a default value, e.g. 0.

In some examples, a syntax element may be signaled to specify how the FrameIndexReference may be derived, or to what reference the FrameIndexAttr is coded. For example, one value of the syntax element may specify that FrameIndexReference is chosen as frame_idx, and another value of the syntax element may specify that FrameIndexReference is chosen as frame_idx*framePeriod.

In some examples, the frame index attribute may be specified to be defined within a point cloud frame (fused frame).

The following describes generalized attribute parameters. For some applications, the attribute parameters may need to be specified more than once for the point cloud. For some frames, certain parameters values may be used, whereas different values may apply to other frames. If the generalized attribute parameters are only signaled in the SPS, then each time the attribute value changes, the SPS may need to be re-signaled. This is not a desirable outcome because typically sequence parameters sets are only updated rarely (when the sequence characteristics change), and often trigger resetting several decoding processes. For applications where there is a need for sending additional parameters more often, current signaling techniques may be inadequate.

For instance, as described above, if attribute parameters are signaled in the SPS, then the attribute parameters for an attribute may be optimal for points in one frame, but suboptimal for an attribute for points in another frame. One way in which to ensure that the optimal attribute parameters are applied to an attribute for points in a frame would be for G-PCC encoder 200 to re-signal the attribute parameters in the SPS every time the attribute parameters change. However, such re-signaling of attribute parameters may result in reconstruction delays because resetting of decoding process, and in some cases additional bits.

The following describes example techniques for applications where it may be beneficial to send additional parameters more often. One or more sets of generalized attribute parameters may be signaled in the bitstream in the APS (adaptive parameter set) or in a syntax structure that is associated with each frame. A syntax structure being associated with a frame may refer to a syntax structure being specific to a frame. For instance, unlike an SPS, where the parameters in the SPS are applicable to multiple frames, the syntax structure being associated with a frame may mean that the syntax structure includes parameters that are specific to that frame.

In some examples, generalized attribute parameters may be signaled in the geometry data unit, or in a separate data unit such as generalized_attribute_parameter_inventory( ). An example of such a syntax structure may be as follows:

|  | Descriptor |
| --- | --- |
| generalized_attribute_parameter_inventory( ) { |  |
| attr_param_frame_idx | tbu |
| // Index to associate which frame the attribute is associated with |  |
| attr_param_seq_parameter_set_id | u(7) |
| // Index to SPS to associate the inventory |  |
| attr_param_sps_attr_idx | ue(v) |
| // Index to associated attribute |  |
| num_attr_parameters | ue(v) |
| for( i = 0; i < num_attr_parameters; i++ ) |  |
| attribute_parameter( ) |  |
| } |  |

For example, G-PCC encoder 200 may determine one or more attribute parameters of an attribute of a point in the point cloud of a frame, where the one or more attribute parameters define how to determine or use a value of the attribute and are applicable to a plurality of points in the point cloud. G-PCC encoder 200 may signal, in a bitstream indicative of the point cloud, the one or more attribute parameters in a syntax structure (e.g., generalized_attribute_parameter_inventory( )) that is specific to the frame (e.g., associated with the frame).

G-PCC decoder 300 may parse, from a bitstream indicative of the point cloud, one or more attribute parameters of a point in the point cloud of a frame in a syntax structure (e.g., generalized_attribute_parameter_inventory( )) that is specific to the frame, where the one or more attribute parameters define how to determine or use a value of the attribute and are applicable to a plurality of points in the point cloud. G-PCC decoder 300 may reconstruct the point of the point cloud based on the one or more attribute parameters.

There may be various examples of the one or more attribute parameters defining how to determine or use a value of the attribute. For example, the attribute parameters may be scale and/or offset values, or may be default values used to determine a value of the attribute. As another example, an attribute parameter may define a full range or a narrow range (e.g., a subrange within a larger range) that can be used to determine a value of the attribute.

As another example, an attribute parameter may define how an attribute is to be used (e.g., how to interpret the value). For instance, the attribute parameter may define how a decoder side entity (e.g., application that uses the point cloud) uses the attribute for processing (e.g., shading, locating, etc.). That is, the application may utilize the attribute parameter to determine how to process the attribute or the point associated with the attribute.

In the above example, generalized_attribute_parameter_inventory( ) may be a syntax structure that is separate from the frame and separate from a parameter set. That is, generalized_attribute_parameter_inventory( ) may not be part of a parameter set, like the SPS. Also, generalized_attribute_parameter_inventory( ) may not be signaled as part of the frame (e.g., in a picture header or slice header), but may be signaled independently, providing additional signaling flexibility.

For instance, the syntax structure: generalized_attribute_parameter_inventory( ) includes the attr_param_frame_idx syntax element. The attr_param_frame_idx syntax element identifies the frame and indicates that the syntax structure (e.g., generalized_attribute_parameter_inventory( ) is specific to the identified frame. Stated another way, as shown in the table, the attr_param_frame_idx syntax element refers to an index to associate which frame the attribute is associated with (e.g., which frame the syntax structure is specific to). Therefore, the attr_param_frame_idx syntax element indicates that this particular syntax structure of generalized_attribute_parameter_inventory( ) is specific to the frame identified by the attr_param_frame_idx syntax element.

Accordingly, G-PCC encoder 200 may signal a syntax element, in the syntax structure, that identifies the frame and indicates that the syntax structure is specific to the identified frame, and G-PCC decoder 300 may parse a syntax element, in the syntax structure, that identifies the frame and indicates that the syntax structure is specific to the identified frame. An example of such a syntax element is the attr_param_frame_idx syntax element, and an example of syntax structure is generalized_attribute_parameter_inventory( ).

Because the syntax element identifies the frame to which the syntax structure is specific to, the syntax structure does not have to be signaled along with the syntax elements of the frame, and can be signaled elsewhere in the bitstream. G-PCC decoder 300 may then determine that the syntax structure is specific to the particular frame based on the attr_param_frame_idx syntax element, allowing G-PCC decoder 300 to then utilize the attribute parameters for reconstructing the value of the attribute of a point, and reconstructing the point from the value of the attribute.

In example of the syntax structure generalized_attribute_parameter_inventory( ) includes the following: num_attr_parameters, and for (i=0; i<num_attr_parameters; i++) attribute parameter( ). The num_attr_parameters may be a syntax element, in the syntax structure, indicative of a number of attribute parameters in the syntax structure. The "for" loop then causes G-PCC encoder 200 to signal the one or more attribute parameters until the number of signaled attribute parameters is equal to the number of attribute parameters in the syntax structure. For instance, if there are five attribute parameters in the syntax structure, num_attr_parameters may equal five, and the "for" loop would repeat until all five attribute parameters are signaled.

Accordingly, G-PCC encoder 200 may signal a syntax element (e.g., num_attr_parameters), in the syntax structure (e.g., generalized_attribute_parameter_inventory( ), indicative of a number of attribute parameters in the syntax structure. In this example, to signal the one or more attribute parameters, G-PCC encoder 200 may signal the one or more attribute parameters until the number of signaled attribute parameters is equal to the number of attribute parameters in the syntax structure. G-PCC decoder 300 may parse a syntax element (e.g., num_attr_parameters), in the syntax structure (e.g., generalized_attribute_parameter_inventory( ), indicative of a number of attribute parameters in the syntax structure. To parse the one or more attribute parameters, G-PCC decoder 300 may parse the one or more attribute parameters until the number of parsed attribute parameters is equal to the number of attribute parameters in the syntax structure.

Alternatively or additionally, for each attribute, an indication may be present in the bitstream to specify whether an attribute parameter is signaled in the SPS, APS or in another syntax structure. In some examples, the generalized attribute parameters may only be signaled in the APS/another syntax structure and not in the SPS.

When an attribute parameter is signaled in the SPS as well as the APS/other syntax structure, the attribute parameter that is present in the APS/other syntax structure may take precedence, i.e., those parameters may apply. In some examples, the attribute parameters in more than one location may apply to a point. An application may choose to apply the parameters successively.

For instance, G-PCC encoder 200 may signal at least one attribute parameter of the one or more attribute parameters in an SPS, APS, or a separate (e.g., different) syntax structure (e.g., in addition to signaling the attribute parameter in the syntax structure). G-PCC decoder 300 may parse at least attribute parameter of the one or more attribute parameters in an SPS, APS, or the separate syntax structure (e.g., in addition to parsing the attribute parameter in the syntax structure). In such cases, there may be a possibility that the attribute parameter in the syntax structure (e.g., that is specific to the frame) and the attribute parameter in the SPS/APS/separate syntax structure are different from one another. In such cases, in some examples, the attribute parameter in the syntax structure may take precedence, in some examples, the attribute parameter in the SPS/APS may take precedence, and in some examples, the application may define which attribute parameter is to take precedence.

For example, G-PCC decoder 300 or some other decoder-side entity may determine that at least one attribute parameter parsed in the SPS is not the same as an attribute parameter of the same parameter type in the syntax structure. In such examples, G-PCC decoder 300 may select the attribute parameter of the same parameter type in the syntax structure for reconstructing the point based on the determination. That is, if there is a difference in the attribute parameter between the SPS/APS/separate syntax structure and the syntax structure specific to the frame, the attribute parameter in the syntax structure specific to the frame may take precedence. In some other examples, the attribute parameter in the SPS/APS/separate (e.g., other or different) syntax structure may take precedence over the attribute parameter in the syntax structure specific to the frame if the attribute parameters are different.

There may be other ways in which to determine which one of the SPS/APS or syntax structure takes precedence. For instance, each attribute parameter may have a different rule applied with respect to one or more conditions described above. For example, when the default value for attribute A is signaled in SPS and default value of attribute A is also signaled in other parts of the bitstream, the default value of SPS make be applied. This may be vice versa for attribute B (i.e., the default value in other parts of bitstream may be applied). The generalized attribute parameters may also be applied normatively to the attribute.

The following describes default parameter values. The default value for a parameter may be signaled in the SPS or may be signaled explicitly as a data unit, as described in G-PCC: Signalling of default attribute values, ISO/IEC JTC1/SC29/WG11 MPEG m53681, Alpbach, April 2020. However, when default value is signaled in SPS and data unit, it is unclear which default value should be applied if the information is not the same for a particular attribute.

A restriction may be added that when default value signaled in an SPS and default value that is signaled in the data unit apply to the same frame, the default value in the two structures should be the same. In some examples, the default value in the data unit may take precedence and be applied for the attribute.

The following describes attribute parameter—scale and offset. An example TMC (test model case) supports a scale and offset parameter to be applied to attributes through the generalized attribute parameter mechanism in the SPS. The current encoder code is as follows:

```
bs.writeUe(param.source_attr_offset_log2);
bs.writeUe(param.source_attr_scale_log2);
bs.byteAlign( );
```

A log 2 value of the scale and offset are applied to the attributes. However, for more finer control, scale and offset may be signaled without the log 2( ) conversion. In some examples, the number of bits used to code the scale and offset parameter may be signaled in the bitstream.

In some examples, effective scale values of magnitude less than one may also be signaled. This may be applied by specifying the scale value at a higher precision and specifying the number of bits used for the precision. The scaled value may then be right shifted with the number of precision bits after adding an offset.

In some examples, a signed scale value may be signaled by explicitly signaling a sign bit, or coding the sign bit it with the scale value.

In some examples, an indication (explicit flag, or signaling a number of bits=0, etc.) may be present to specify that the only the scale or only the offset is present in the attribute parameter.

The syntax may be as follows:

| | |
|---|---|
| source_attr_offset_num_bits | ue(v) |
| // Signal a number of bits for offset value | |
| source_attr_offset | u(v) |
| source_attr_scale_num_bits | ue(v) |
| // Signal a number of bits for scale value | |
| source_attr_scale | u(v) |
| source_attr_num_precision_bits | ue(v) |
| // Signal a number of bits for precision of scale value | |

One or more of the syntax elements may be signaled as a fixed length parameter. source_attr_scale may be coded as s(v) (e.g., fixed length coding).

The scaling of the attribute value x may be applied as one of the following: (x*source_attr_scale+off)>>source_attr_num_precision_bits+source_attr_offset
(x*source_attr_scale+source_attr_offset+off)>>source_attr_num_precision_bits Other equations of scaling may also be applied.

For instance, the one or more attribute parameters may be a scale parameter that defines an amount by which to scale a value of the attribute. In such examples, G-PCC encoder 200 may signal a number of bits for the scale value (e.g., source_attr_scale_num_bits) and signal the scale value (e.g., source_attr_scale). The scale value may not be power of two value (e.g., log 2( ) value) or may be a fractional value. G-PCC decoder 300 may parse a number of bits for the scale value (e.g., source_attr_scale_num_bits) and parse the scale value (e.g., source_attr_scale). The scale value may not be power of two value (e.g., log 2( ) value) or may be a fractional value.

As another example, the one or more attribute parameters may be an offset parameter that defines an amount by which to offset a value of the attribute. In such examples, G-PCC encoder 200 may signal a number of bits for the offset value (e.g., source_attr_offset_num_bits) and signal the scale value (e.g., source_attr_offset). The offset value may not be power of two value (e.g., log 2( ) value) or may be a fractional value. G-PCC decoder 300 may parse a number of bits for the offset value (e.g., source_attr_offset_num_bits) and parse the offset value (e.g., source_attr_offset). The offset value may not be power of two value (e.g., log 2( ) value) or may be a fractional value.

Figure 4:
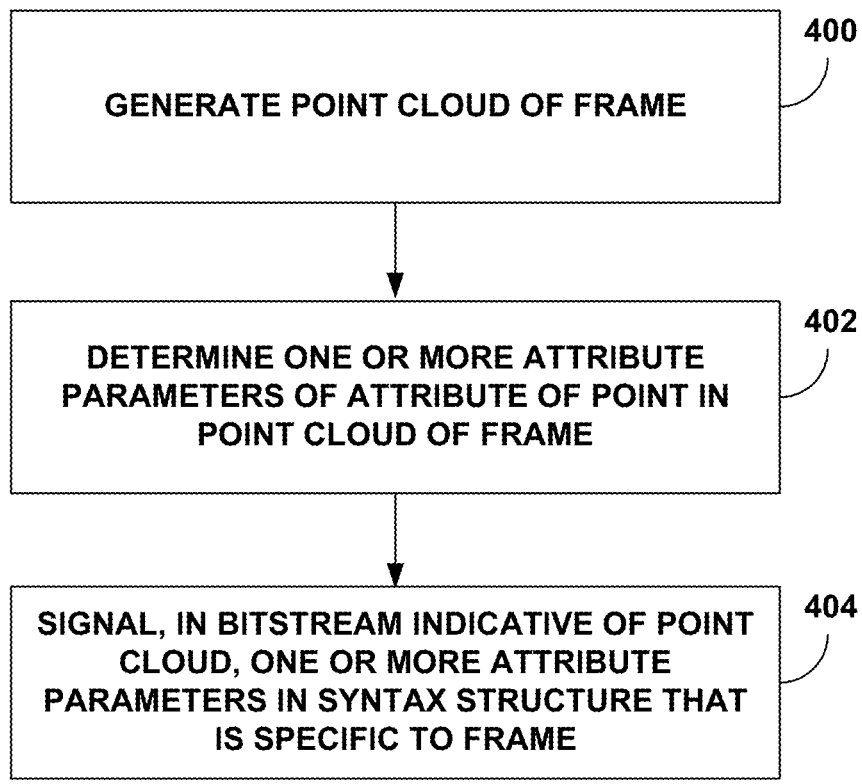
FIG. 4 is a flowchart illustrating an example operation of a G-PCC encoder.

FIG. 4 is a flowchart illustrating an example operation of a G-PCC encoder. G-PCC encoder 200 may generate a point cloud of a frame (400). For example, G-PCC encoder 200 may receive images captured by a variety of cameras or sensors such as LIDAR sensors and 3D scanners. G-PCC encoder 200 may select points from the images that together form the point cloud of a frame. G-PCC encoder 200 may determine attribute values for the points in the point cloud. In some examples, G-PCC encoder 200 may receive attribute values for points of a point cloud of a frame from computer-generated point clouds.

G-PCC encoder 200 may determine one or more attribute parameters of an attribute of a point in the point cloud of a frame (402). The one or more attribute parameters may define how to determine or use a value of the attribute and are applicable to a plurality of points in the point cloud. For instance, the one or more attribute parameters may include at least one of a default value of the attribute, a scale parameter that defines an amount by which to scale the value of the attribute, and an offset parameter that defines an amount by which to offset the value of the attribute.

G-PCC encoder 200 may signal, in a bitstream indicative of the point cloud, the one or more attribute parameters in a syntax structure that is specific to the frame (404). One example of the syntax structure that is specific to the frame is the generalized_attribute_parameter_inventory( ) syntax structure. For instance, the syntax structure specific to the frame may be a syntax structure that is separate from the frame and separate from a parameter set. As an example, the generalized_attribute_parameter_inventory( ) syntax structure may not be part of an SPS or APS.

Also, G-PCC encoder 200 may signal a syntax element, in the syntax structure, that identifies the frame and indicates that the syntax structure is specific to the identified frame. For instance, G-PCC encoder 200 may signal the attr_param_frame_idx syntax element that identifies the frame and indicates that that particular version of the generalized_attribute_parameter_inventory( ) syntax structure is specific to the frame identified by the attr_param_frame_idx syntax element.

In some examples, G-PCC encoder 200 may signal a syntax element, in the syntax structure, indicative of a number of attribute parameters in the syntax structure. For example, G-PCC encoder 200 may signal the num_attr_parameters syntax element that indicates a number of attribute parameters in the generalized_attribute_parameter_inventory( ) syntax structure. In such examples, to signal the one or more attribute parameters, G-PCC encoder 200 may signal the one or more attribute parameters until the number of signaled attribute parameters is equal to the number of attribute parameters in the syntax structure.

Figure 5:
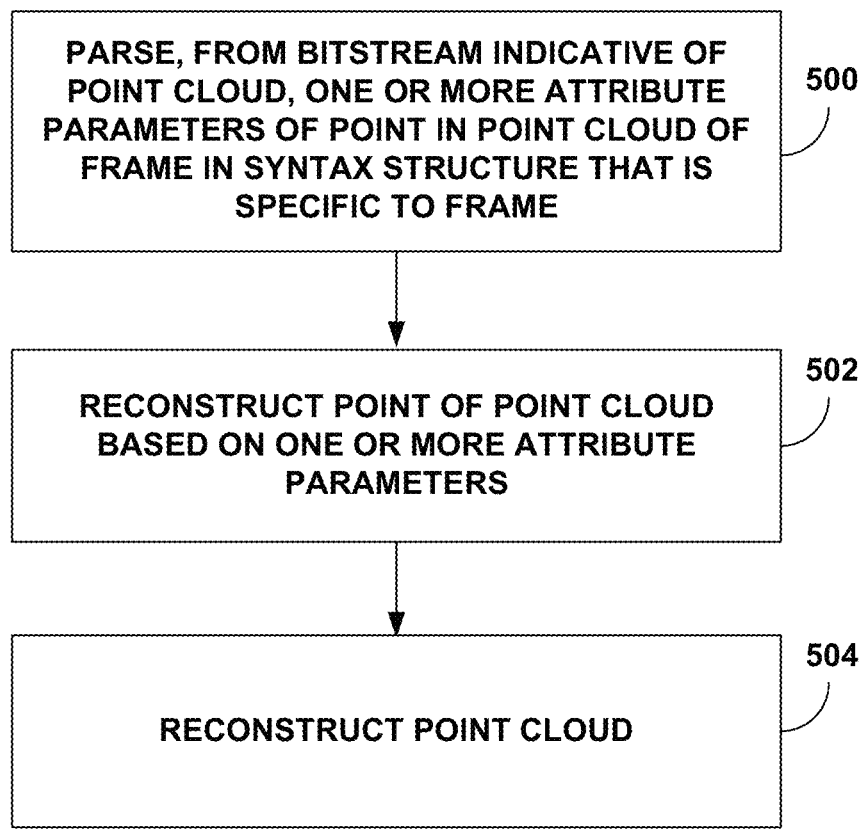
FIG. 5 is a flowchart illustrating an example operation of a G-PCC decoder.

FIG. 5 is a flowchart illustrating an example operation of a G-PCC decoder. In some examples, G-PCC decoder 300 may parse, from a bitstream indicative of the point cloud, one or more attribute parameters of a point in the point cloud of a frame in a syntax structure that is specific to the frame (500). For instance, the one or more attribute parameters define how to determine or use a value of the attribute and are applicable to a plurality of points in the point cloud. Examples of the one or more attribute parameters includes at least one of a default value of the attribute, a scale parameter that defines an amount by which to scale the value of the attribute, and an offset parameter that defines an amount by which to offset the value of the attribute.

In some examples, G-PCC decoder 300 may be configured to utilize the attribute parameters. However, the techniques are not so limited. In some examples, a decoder-side entity (e.g., an application that uses the point cloud) may be configured to utilize the attribute parameters. For instance, the decoder side entity may apply the attribute parameters after G-PCC decoder 300 has reconstructed the point cloud. In some examples, G-PCC decoder 300 may utilize some of the attribute parameters, and the decoder-side entity may use some of the other attribute parameters.

As an example, the syntax structure may be the generalized_attribute_parameter_inventory( ) syntax structure. As described above, the generalized_attribute_parameter_inventory( ) syntax structure may be a syntax structure that separate from the frame and separate from a parameter (e.g., like SPS or APS).

G-PCC decoder 300 may be configured to parse a syntax element, in the syntax structure, that identifies the frame and indicates that the syntax structure is specific to the identified frame. For example, G-PCC decoder 300 may be configured to parse the attr_param_frame_idx syntax element that identifies the frame and indicates that that particular version of the generalized_attribute_parameter_inventory( ) syntax structure is specific to the frame identified by the attr_param_frame_idx syntax element.

In some examples, G-PCC decoder 300 may parse a syntax element, in the syntax structure, indicative of a number of attribute parameters in the syntax structure. For example, G-PCC decoder 300 may parse the num_attr_parameters syntax element that indicates a number of attribute parameters in the generalized_attribute_parameter_inventory( ) syntax structure. In such examples, to parse the one or more attribute parameters, G-PCC decoder 300 may parse the one or more attribute parameters until the number of parsed attribute parameters is equal to the number of attribute parameters in the syntax structure.

G-PCC decoder 300 may reconstruct the point of the point cloud based on the one or more attribute parameters (502). For instance, with the attribute parameters, G-PCC decoder 300 may determine the value(s) of an attribute. The result from determining the value(s) of the attribute may be the reconstructed point. G-PCC decoder 300 may reconstruct the point cloud (504). For instance, G-PCC decoder 300 may repeat the above example techniques for each point in the point cloud to reconstruct the entire point cloud.

Examples in the various aspects of this disclosure may be used individually or in any combination.

Clause 1: A method of encoding a point cloud includes determining one or more attribute parameters of an attribute of a point in the point cloud of a frame, wherein the one or more attribute parameters define how to determine or use a value of the attribute and are applicable to a plurality of points in the point cloud; and signaling, in a bitstream indicative of the point cloud, the one or more attribute parameters in a syntax structure that is specific to the frame.

Clause 2: The method of clause 1, wherein the one or more attribute parameters comprise at least one of a default value of the attribute, a scale parameter that defines an amount by which to scale the value of the attribute, or an offset parameter that defines an amount by which to offset the value of the attribute.

Clause 3: The method of any of clauses 1 and 2, wherein the syntax structure specific to the frame comprises a syntax structure that is separate from the frame and separate from a parameter set.

Clause 4: The method of any of clauses 1 through 3, further includes signaling a syntax element, in the syntax structure, that identifies the frame and indicates that the syntax structure is specific to the identified frame.

Clause 5: The method of any of clauses 1 through 4, further includes signaling a syntax element, in the syntax structure, indicative of a number of attribute parameters in the syntax structure, wherein signaling the one or more attribute parameters comprises signaling the one or more attribute parameters until the number of signaled attribute parameters is equal to the number of attribute parameters in the syntax structure.

Clause 6: The method of any of clauses 1 through 5, wherein the one or more attribute parameters comprise a scale parameter that defines an amount by which to scale the value of the attribute, the method further includes signaling a number of bits for the scale value; and signaling the scale value, wherein the scale value: is not a power of two value, or is a fractional value.

Clause 7: The method of any of clauses 1 through 6, wherein the one or more attribute parameters comprise an offset parameter that defines an amount by which to offset the value of the attribute, the method further includes signaling a number of bits for the offset value; and signaling the offset value, wherein the offset value: is not a power of two value, or is a fractional value.

Clause 8: The method of any of clauses 1 through 7, further includes signaling at least one attribute parameter of the one or more attribute parameters in a sequence parameter set (SPS), an adaptive parameter set (APS), or a separate syntax structure.

Clause 9: The method of any of clauses 1 through 8, further includes generating the point cloud.

Clause 10: A method of decoding a point cloud includes parsing, from a bitstream indicative of the point cloud, one or more attribute parameters of a point in the point cloud of a frame in a syntax structure that is specific to the frame, wherein the one or more attribute parameters define how to determine or use a value of the attribute and are applicable to a plurality of points in the point cloud; and reconstructing the point of the point cloud based on the one or more attribute parameters.

Clause 11: The method of clause 10, wherein the one or more attribute parameters comprise at least one of a default value of the attribute, a scale parameter that defines an amount by which to scale the value of the attribute, or an offset parameter that defines an amount by which to offset the value of the attribute.

Clause 12: The method of any of clauses 10 and 11, wherein the syntax structure specific to the frame comprises a syntax structure that is separate from the frame and separate from a parameter set.

Clause 13: The method of any of clauses 10 through 12, further includes parsing a syntax element, in the syntax structure, that identifies the frame and indicates that the syntax structure is specific to the identified frame.

Clause 14: The method of any of clauses 10 through 13, further includes parsing a syntax element, in the syntax structure, indicative of a number of attribute parameters in the syntax structure, wherein parsing the one or more attribute parameters comprises parsing the one or more attribute parameters until the number of parsed attribute parameters is equal to the number of attribute parameters in the syntax structure.

Clause 15: The method of any of clauses 10 through 14, wherein the one or more attribute parameters comprise a scale parameter that defines an amount by which to scale the value of the attribute, the method further includes parsing a number of bits for the scale value; and parsing the scale value based on the number of bits for the scale value, wherein the scale value: is not a power of two value, or is a fractional value.

Clause 16: The method of any of clauses 10 through 15, wherein the one or more attribute parameters comprise an offset parameter that defines an amount by which to offset the value of the attribute, the method further includes parsing a number of bits for the offset value; and parsing the offset value based on the number of bits for the offset value, wherein the offset value: is not a power of two value, or is a fractional value.

Clause 17: The method of any of clauses 10 through 16, further includes parsing at least one attribute parameter of the one or more attribute parameters in a sequence parameter set (SPS), an adaptive parameter set (APS), or a separate syntax structure.

Clause 18: The method of clause 17, wherein the at least one parameter is of a parameter type, the method further includes determining that the at least one attribute parameter parsed in the SPS is not the same as an attribute parameter of the same parameter type in the syntax structure; and selecting the attribute parameter of the same parameter type in the syntax structure for reconstructing the point based on the determination.

Clause 19: A device for encoding a point cloud includes memory configured to store the point cloud; and processing circuitry configured to: determine one or more attribute parameters of an attribute of a point in the point cloud of a frame, wherein the one or more attribute parameters define how to determine or use a value of the attribute and are applicable to a plurality of points in the point cloud; and signal, in a bitstream indicative of the point cloud, the one or more attribute parameters in a syntax structure that is specific to the frame.

Clause 20: The device of clause 19, wherein the one or more attribute parameters comprise at least one of a default value of the attribute, a scale parameter that defines an amount by which to scale the value of the attribute, or an offset parameter that defines an amount by which to offset the value of the attribute.

Clause 21: The device of any of clauses 19 and 20, wherein the syntax structure specific to the frame comprises a syntax structure that is separate from the frame and separate from a parameter set.

Clause 22: The device of any of clauses 19 through 21, wherein the processing circuitry is configured to: signal a syntax element, in the syntax structure, that identifies the frame and indicates that the syntax structure is specific to the identified frame.

Clause 23: The device of any of clauses 19 through 22, wherein the processing circuitry is configured to: signal a syntax element, in the syntax structure, indicative of a number of attribute parameters in the syntax structure, wherein to signal the one or more attribute parameters, the processing circuitry is configured to signal the one or more attribute parameters until the number of signaled attribute parameters is equal to the number of attribute parameters in the syntax structure.

Clause 24: The device of any of clauses 19 through 23, wherein the one or more attribute parameters comprise a scale parameter that defines an amount by which to scale the value of the attribute, and wherein the processing circuitry is configured to: signal a number of bits for the scale value; and signal the scale value, wherein the scale value: is not a power of two value, or is a fractional value.

Clause 25: The device of any of clauses 19 through 24, wherein the one or more attribute parameters comprise an offset parameter that defines an amount by which to offset the value of the attribute, and wherein the processing circuitry is configured to: signal a number of bits for the offset value; and signal the offset value, wherein the offset value: is not a power of two value, or is a fractional value.

Clause 26: The device of any of clauses 19 through 25, wherein the processing circuitry is configured to: signal at least one attribute parameter of the one or more attribute parameters in a sequence parameter set (SPS), an adaptive parameter set (APS), or a separate syntax structure.

Clause 27: The device of any of clauses 19 through 26, wherein the processing circuitry is configured to: generate the point cloud.

Clause 28: A device for decoding a point cloud includes memory configured to store the point cloud; and processing circuitry configured to: parse, from a bitstream indicative of the point cloud, one or more attribute parameters of a point in the point cloud of a frame in a syntax structure that is specific to the frame, wherein the one or more attribute parameters define how to determine or use a value of the attribute and are applicable to a plurality of points in the point cloud; and reconstruct the point of the point cloud based on the one or more attribute parameters.

Clause 29: The device of clause 28, wherein the one or more attribute parameters comprise at least one of a default value of the attribute, a scale parameter that defines an amount by which to scale the value of the attribute, or an offset parameter that defines an amount by which to offset the value of the attribute.

Clause 30: The device of any of clauses 28 and 29, wherein the syntax structure specific to the frame comprises a syntax structure that is separate from the frame and separate from a parameter set.

Clause 31: The device of any of clauses 28 through 30, wherein the processing circuitry is configured to: parse a syntax element, in the syntax structure, that identifies the frame and indicates that the syntax structure is specific to the identified frame.

Clause 32: The device of any of clauses 28 through 31, wherein the processing circuitry is configured to: parse a syntax element, in the syntax structure, indicative of a number of attribute parameters in the syntax structure, wherein to parse the one or more attribute parameters, the processing circuitry is configured to parse the one or more attribute parameters until the number of parsed attribute parameters is equal to the number of attribute parameters in the syntax structure.

Clause 33: The device of any of clauses 28 through 32, wherein the one or more attribute parameters comprise a scale parameter that defines an amount by which to scale the value of the attribute, wherein the processing circuitry is configured to: parse a number of bits for the scale value; and parse the scale value based on the number of bits for the scale value, wherein the scale value: is not a power of two value, or is a fractional value.

Clause 34: The device of any of clauses 28 through 33, wherein the one or more attribute parameters comprise an offset parameter that defines an amount by which to offset the value of the attribute, and wherein the processing circuitry is configured to: parse a number of bits for the offset value; and parse the offset value based on the number of bits for the offset value, wherein the offset value: is not a power of two value, or is a fractional value.

Clause 35: The device of any of clauses 28 through 34, wherein the processing circuitry is configured to: parse at least one attribute parameter of the one or more attribute parameters in a sequence parameter set (SPS), an adaptive parameter set (APS), or a separate syntax structure.

Clause 36: The device of clause 35, wherein the at least one parameter is of a parameter type, and wherein the processing circuitry is configured to: determine that the at least one attribute parameter parsed in the SPS is not the same as an attribute parameter of the same parameter type in the syntax structure; and select the attribute parameter of the same parameter type in the syntax structure for reconstructing the point based on the determination.

Clause 37: A computer-readable storage medium storing instructions thereon that when executed cause one or more processors to: determine one or more attribute parameters of an attribute of a point in the point cloud of a frame, wherein the one or more attribute parameters define how to determine or use a value of the attribute and are applicable to a plurality of points in the point cloud; and signal, in a bitstream indicative of the point cloud, the one or more attribute parameters in a syntax structure that is specific to the frame.

Clause 38: A computer-readable storage medium storing instructions thereon that when executed cause one or more processors to: parse, from a bitstream indicative of the point cloud, one or more attribute parameters of a point in the point cloud of a frame in a syntax structure that is specific to the frame, wherein the one or more attribute parameters define how to determine or use a value of the attribute and are applicable to a plurality of points in the point cloud; and reconstruct the point of the point cloud based on the one or more attribute parameters.

Clause 39: A device for encoding a point cloud includes means for determining one or more attribute parameters of an attribute of a point in the point cloud of a frame, wherein the one or more attribute parameters define how to determine or use a value of the attribute and are applicable to a plurality of points in the point cloud; and means for signaling, in a bitstream indicative of the point cloud, the one or more attribute parameters in a syntax structure that is specific to the frame.

Clause 40: A device for decoding a point cloud includes means for parsing, from a bitstream indicative of the point cloud, one or more attribute parameters of a point in the point cloud of a frame in a syntax structure that is specific to the frame, wherein the one or more attribute parameters define how to determine or use a value of the attribute and are applicable to a plurality of points in the point cloud; and means for reconstructing the point of the point cloud based on the one or more attribute parameters.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding a point cloud, the method comprising:
    determining attribute parameters of an attribute of a point in the point cloud of a frame, wherein the attribute parameters define how to determine or use a value of the attribute and are applicable to a plurality of points in the point cloud, wherein the attribute parameters include a scale parameter used to define an amount by which to scale the value of the attribute and an offset parameter that defines an amount by which to offset after scaling the value;
    signaling, in a bitstream indicative of the point cloud, the attribute parameters using a syntax structure that is specific to the frame and separate from a parameter set; and
    signaling a syntax element, in the syntax structure, that identifies the frame.

2. The method of claim 1, wherein the attribute parameters further include a default value of the attribute.

3. The method of claim 1, wherein the syntax structure is separate from the frame.

4. The method of claim 1
    wherein the syntax element indicates that the syntax structure is specific to the identified frame.

5. The method of claim 1, wherein the syntax element is a first syntax element, the method further comprising:
    signaling a second syntax element, in the syntax structure, indicative of a number of attribute parameters in the syntax structure,
    wherein signaling the attribute parameters comprises signaling the attribute parameters until the number of signaled attribute parameters is equal to the number of attribute parameters in the syntax structure.

6. The method of claim 1, further comprising:
    signaling a number of bits for the scale parameter,
    wherein the scale parameter:
        is not a power of two value, or
        is a fractional value.

7. The method of claim 1, further comprising:
    signaling a number of bits for the offset parameter,
    wherein the offset parameter:
        is not a power of two value, or
        is a fractional value.

8. The method of claim 1, further comprising:
    signaling at least one attribute parameter of the attribute parameters also in a sequence parameter set (SPS), an adaptive parameter set (APS), or a separate syntax structure.

9. The method of claim 1, further comprising:
    generating the point cloud.

10. A method of decoding a point cloud, the method comprising:
    parsing, from a bitstream indicative of the point cloud and for interpretation by a decoder side entity, attribute parameters of a point in the point cloud of a frame using a syntax structure that is specific to the frame and separate from a parameter set, wherein the attribute parameters define how to determine or use a value of the attribute and are applicable to a plurality of points in the point cloud, and wherein the attribute parameters include a scale parameter used to define an amount by which to scale the value of the attribute and an offset parameter that defines an amount by which to offset after scaling the value; and parsing a syntax element, in the syntax structure, that identifies the frame.

11. The method of claim 10, wherein the attribute parameters further include a default value of the attribute.

12. The method of claim 10, wherein the syntax structure is separate from the frame.

13. The method of claim 10,
wherein the syntax element indicates that the syntax structure is specific to the identified frame.

14. The method of claim 10, wherein the syntax element is a first syntax element, the method further comprising:
parsing a second syntax element, in the syntax structure, indicative of a number of attribute parameters in the syntax structure,
wherein parsing the attribute parameters comprises parsing the attribute parameters until the number of parsed attribute parameters is equal to the number of attribute parameters in the syntax structure.

15. The method of claim 10, further comprising:
parsing a number of bits for the scale parameter,
wherein the scale parameter:
is not a power of two value, or
is a fractional value.

16. The method of claim 10, further comprising:
parsing a number of bits for the offset parameter,
wherein the offset parameter:
is not a power of two value, or
is a fractional value.

17. The method of claim 10, further comprising:
parsing at least one attribute parameter of the attribute parameters in a sequence parameter set (SPS), an adaptive parameter set (APS), or a separate syntax structure.

18. The method of claim 17, wherein the at least one parameter is of a parameter type, the method further comprising:
determining that the at least one attribute parameter parsed in the SPS is not the same as an attribute parameter of the same parameter type in the syntax structure; and
selecting the attribute parameter of the same parameter type in the syntax structure based on the determination.

19. A device for encoding a point cloud, the device comprising:
memory configured to store the point cloud; and
processing circuitry configured to:
determine attribute parameters of an attribute of a point in the point cloud of a frame, wherein the attribute parameters define how to determine or use a value of the attribute and are applicable to a plurality of points in the point cloud, wherein the attribute parameters include a scale parameter used to define an amount by which to scale the value of the attribute and an offset parameter that defines an amount by which to offset after scaling the value;
signal, in a bitstream indicative of the point cloud, the attribute parameters using a syntax structure that is specific to the frame and separate from a parameter set; and signal a syntax element, in the syntax structure, that identifies the frame.

20. The device of claim 19, wherein the attribute parameters further include a default value of the attribute.

21. The device of claim 19, wherein the syntax structure is separate from the frame.

22. The device of claim 19, wherein
the syntax element indicates that the syntax structure is specific to the identified frame.

23. The device of claim 19, wherein the syntax element is a first syntax element, and wherein the processing circuitry is configured to:
signal a second syntax element, in the syntax structure, indicative of a number of attribute parameters in the syntax structure,
wherein to signal the attribute parameters, the processing circuitry is configured to signal the attribute parameters until the number of signaled attribute parameters is equal to the number of attribute parameters in the syntax structure.

24. The device of claim 19, wherein the processing circuitry is configured to:
signal a number of bits for the scale parameter,
wherein the scale parameter:
is not a power of two value, or
is a fractional value.

25. The device of claim 19, wherein the processing circuitry is configured to:
signal a number of bits for the offset parameter,
wherein the offset parameter:
is not a power of two value, or
is a fractional value.

26. The device of claim 19, wherein the processing circuitry is configured to:
signal at least one attribute parameter of the attribute parameters also in a sequence parameter set (SPS), an adaptive parameter set (APS), or a separate syntax structure.

27. The device of claim 19, wherein the processing circuitry is configured to:
generate the point cloud.

28. A device for decoding a point cloud, the device comprising:
memory configured to store the point cloud; and
processing circuitry configured to:
parse, from a bitstream indicative of the point cloud and for interpretation by a decoder side entity, attribute parameters of a point in the point cloud of a frame using a syntax structure that is specific to the frame and separate from a parameter set, wherein the attribute parameters define how to determine or use a value of the attribute and are applicable to a plurality of points in the point cloud, and wherein the attribute parameters include a scale parameter used to define an amount by which to scale the value of the attribute and an offset parameter that defines an amount by which to offset after scaling the value; and
parse a syntax element, in the syntax structure, that identifies the frame.

29. The device of claim 28, wherein the attribute parameters further include a default value of the attribute.

30. The device of claim 28, wherein the syntax structure is separate from the frame.

31. The device of claim 28,
wherein the syntax element indicates that the syntax structure is specific to the identified frame.

32. The device of claim 28, wherein the syntax element is a first syntax element, and wherein the processing circuitry is configured to:
parse a second syntax element, in the syntax structure, indicative of a number of attribute parameters in the syntax structure,
wherein to parse the attribute parameters, the processing circuitry is configured to parse the attribute parameters until the number of parsed attribute parameters is equal to the number of attribute parameters in the syntax structure.

33. The device of claim 28, wherein the processing circuitry is configured to:
parse a number of bits for the scale parameter,
wherein the scale parameter:
is not a power of two value, or
is a fractional value.

34. The device of claim 28, wherein the processing circuitry is configured to:
parse a number of bits for the offset parameter,
wherein the offset parameter:
is not a power of two value, or
is a fractional value.

35. The device of claim 28, wherein the processing circuitry is configured to:
parse at least one attribute parameter of the attribute parameters in a sequence parameter set (SPS), an adaptive parameter set (APS), or a separate syntax structure.

36. The device of claim 35, wherein the at least one parameter is of a parameter type, and wherein the processing circuitry is configured to:
determine that the at least one attribute parameter parsed in the SPS is not the same as an attribute parameter of the same parameter type in the syntax structure; and
select the attribute parameter of the same parameter type in the syntax structure based on the determination.

37. A non-transitory computer-readable storage medium storing instructions thereon that when executed cause one or more processors to:
parse, from a bitstream indicative of a point cloud and for interpretation by a decoder side entity, attribute parameters of a point in the point cloud of a frame using a syntax structure that is specific to the frame and separate from a parameter set, wherein the attribute parameters define how to determine or use a value of the attribute and are applicable to a plurality of points in the point cloud, and wherein the attribute parameters include a scale parameter used to define an amount by which to scale the value of the attribute and an offset parameter that defines an amount by which to offset after scaling the value; and
parse a syntax element, in the syntax structure, that identifies the frame.

38. A device for encoding a point cloud, the device comprising:
means for determining attribute parameters of an attribute of a point in the point cloud of a frame, wherein the attribute parameters define how to determine or use a value of the attribute and are applicable to a plurality of points in the point cloud, wherein the attribute parameters include a scale parameter used to define an amount by which to scale the value of the attribute and an offset parameter that defines an amount by which to offset after scaling the value;
means for signaling, in a bitstream indicative of the point cloud, the attribute parameters using a syntax structure that is specific to the frame and separate from a parameter set; and
means for signaling a syntax element, in the syntax structure, that identifies the frame.

* * * * *